Figure 1:
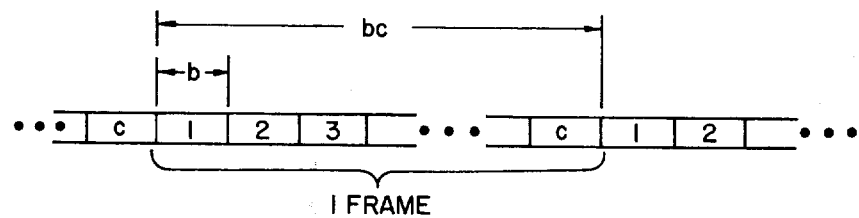

United States Patent [19]
Collins et al.

[11] 3,956,593
[45] May 11, 1976

[54] TIME SPACE TIME (TST) SWITCH WITH COMBINED AND DISTRIBUTED STATE STORE AND CONTROL STORE

[75] Inventors: Arthur A. Collins; John C. Bellamy, II, both of Dallas; Richard L. Christensen, Richardson, all of Tex.

[73] Assignee: Artura A. Collins, Inc., Dallas, Tex.

[22] Filed: Oct. 15, 1974

[21] Appl. No.: 514,828

[52] U.S. Cl............... 179/15 AQ; 179/15 AT; 179/15 A
[51] Int. Cl.[2]............... H04Q 11/04; H04J 3/00
[58] Field of Search....... 179/15 AQ, 15 AT, 15 AL, 179/15 A, 15 BY, 15 BS

[56] References Cited
UNITED STATES PATENTS

| | | |
|---|---|---|
| 3,715,505 | 2/1973 | Gordon............ 179/15 AQ |
| 3,740,480 | 6/1973 | Krupp............ 179/15 AQ |
| 3,796,835 | 3/1974 | Closs............ 179/15 AT |

*Primary Examiner*—Kathleen Claffy
*Assistant Examiner*—Joseph Popek
*Attorney, Agent, or Firm*—Warren H. Kintzinger

[57] ABSTRACT

A time space time (TST) switch using two basic modules, a time switching module and a space switching module with individual module elements interconnectable to realize a great range of time division switch sizes and configurations. Control stores and state stores associated with respective switching elements are combined and incorporated into the time switch and space switch modules.

33 Claims, 12 Drawing Figures

TIME SWITCH ELEMENT

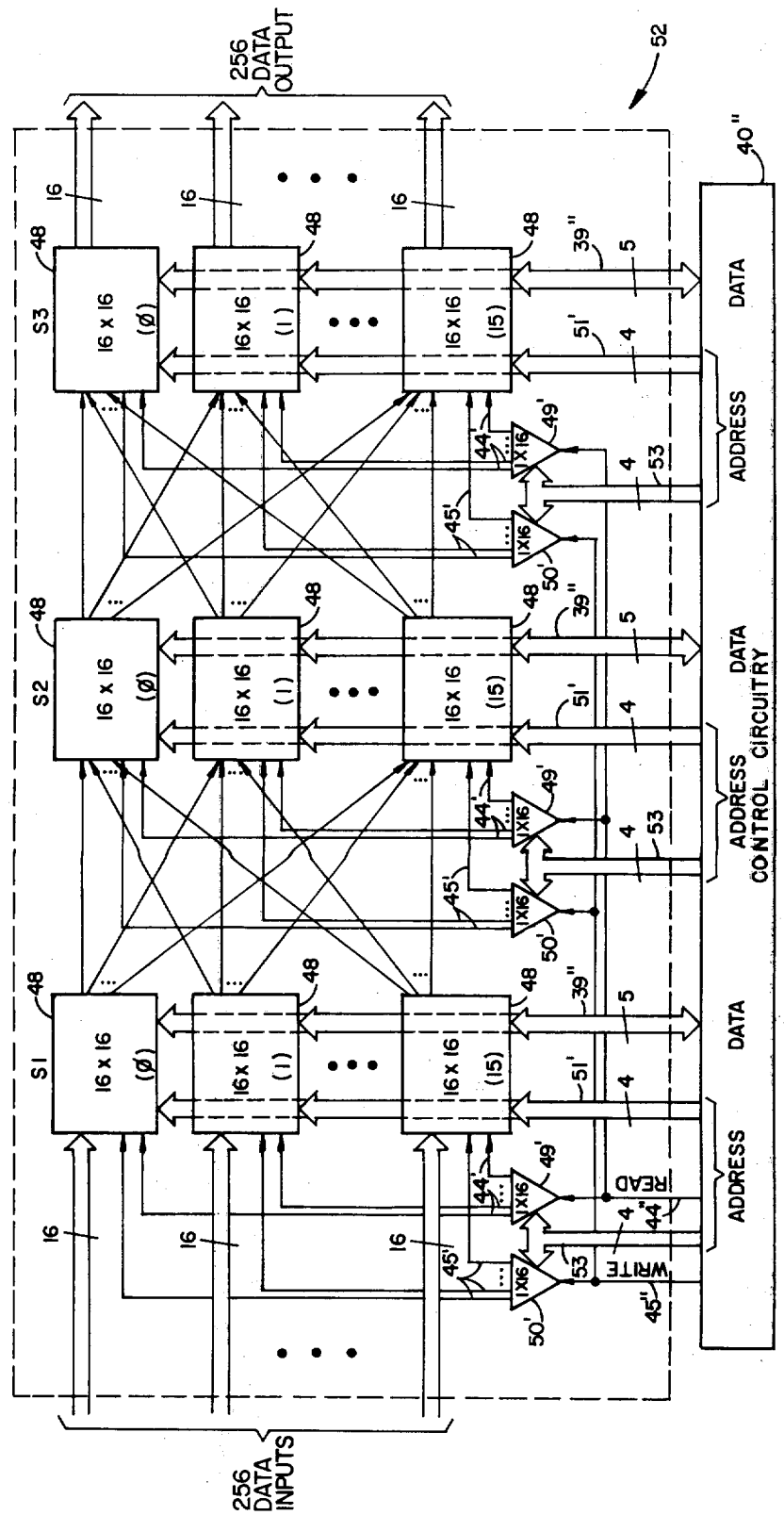
FIG. 7  256×256 THREE STAGE TIME DIVIDED SPACE SWITCH

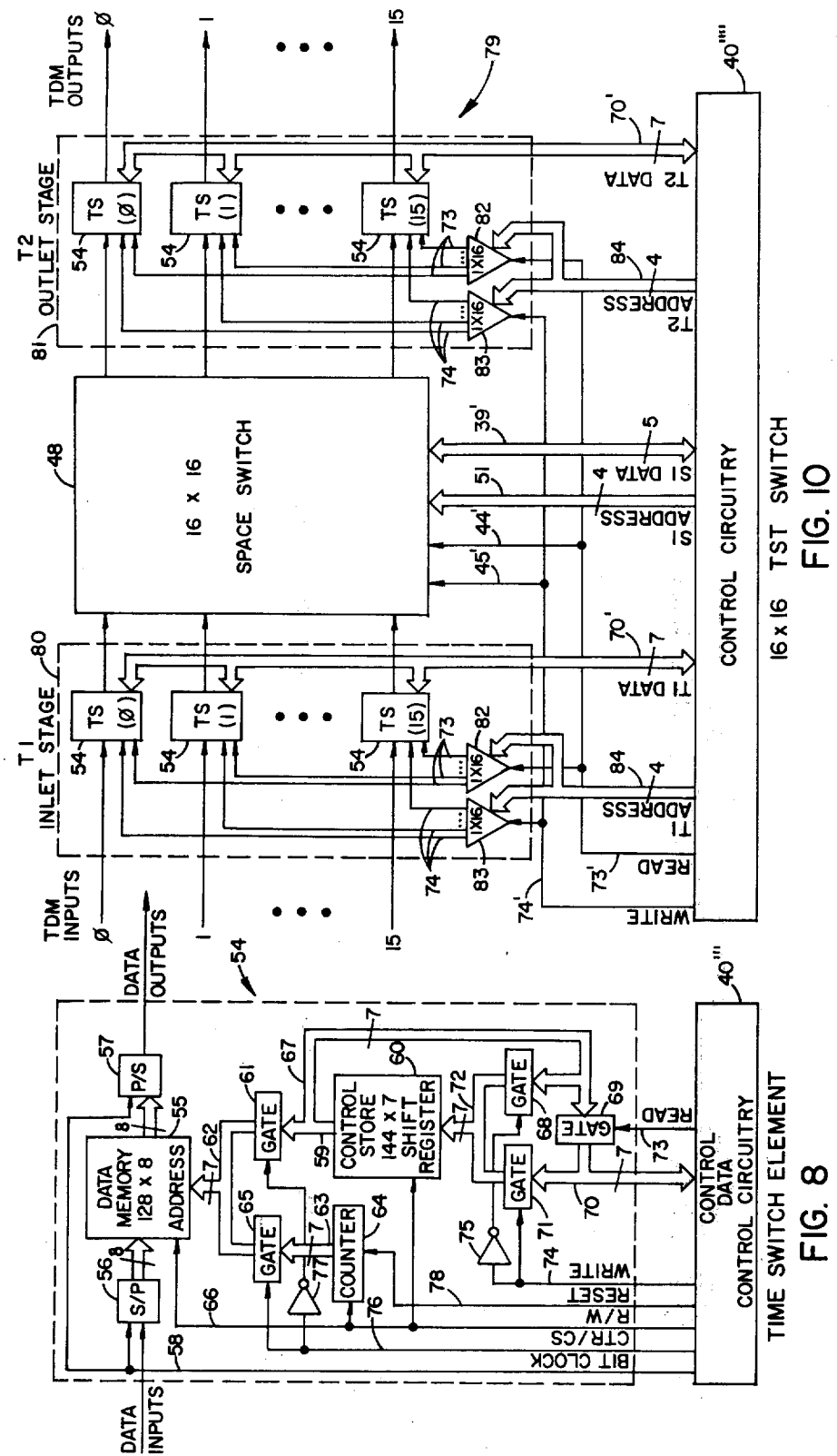

INLET MEMORY TIMING

OUTLET MEMORY TIMING

TIME SPACE TIME (TST) SWITCH WITH COMBINED AND DISTRIBUTED STATE STORE AND CONTROL STORE

This invention relates in general to time space time (TST) telecommunication system switches, and, in particular, to TST switches for interconnecting digital Time Division Multiplex (TDM) communication lines, using two basic modules, a plurality of time switching modules and a plurality of space switching modules. A time folded TST switch concept is taught and claimed in co-pending application, Ser. No. 497,214, filed Aug. 14, 1974 with two of the co-inventors here being common co-inventors with another inventor thereof.

Time Space Time (TST) switches are a particularly useful configuration of switching elements providing both time and space translation between channels of Time Division Multiplexed (TDM) telecommunications transmission lines. A TST switch interconnects digital bi-directional TDM communication lines with TDM communication involving the sharing of single transmission paths, individually, in time to provide multiple channels in a single transmission medium. This is a fundamental system improvement in telephone communications that should prove helpful in reducing cost of ordinary telephone service, and in enhancing the ability to provide many new kinds of service in meeting expanded communications needs. Electromechanical crossbar and relay switching systems, as generally used today in telecommunications switching have, for practical purposes, reached the limit of their capabilities. Extensive, continued adherence to these older technologies severely restricts capability, and greatly increases costs of telecommunication systems; and, particularly so with the expansion to systems of great size and complexity. While many advances have been made in capability and efficiency in the transmission area, with microwave, satellite, and high-capacity cable, and with both analog and digital repeaters and terminals being used, the exchange plant, including switching equipment in central offices and branch exchanges, remain in essence the same as in the very early days. Recent advances in solid state technology make the use of all digital switching and transmission techniques more attractive today than ever before.

The advent of digital multiplex transmission systems gives rise to many possibilities, particularly with TDM multiplex terminals beginning to look like switches. Message signals in these terminals appear in "time slots," and transfer of signals between time slots is accomplished by a "time slot interchange," with time-division switches connected directly to multiplex transmission lines. Another important saving is accomplished through elimination of digital-to-analog, and analog-to-digital, conversions at every switch. The existing local exchange area plant represents the major part of telephone plant investment, and the least efficient portion of the system—with large quantities of scarce materials required. Further, physical congestion problems are encountered with entrance cables as they approach the central office, and, many times, there are difficult growth problems in central office main distribution frames. Present central office switching includes bulky electromechanical switching stages located in large, costly, building space. Costs for new construction and maintenance of such traditional exchange area plants are constantly increasing, particularly with large cable networks employed when cable pair utilization is inherently very low with a dedicated physical wire pair used to connect each subscriber station to its central office. Thus, system improvements attainable with time division transmission and switching techniques are very significant.

It is therefore a principal object of this invention to provide a time space time (TST) switch system achieving significant improvements in operation and in minimized equipment costs, in using two basic modules, a time switching module and a space switching module, in selectively interconnecting digital bi-directional Time Division Multiplexed (TDM) transmission paths.

Another object is to provide such a TST switch system wherein the two basic modules may be interconnected to realize virtually any size and configuration of a time division switch.

A further object is to achieve improved reliability and lessened maintenance requirements through use of such TST switch systems using two basic modules.

Features of this invention useful in accomplishing the above objects include, in a TST switch with combined and distributed state and control stores, the use of two basic modules, a time switching module and a space switching module with three circuit types (excluding clock and control circuits). The three circuit types include the time switch module control portion, the time switch module memory portion, and the space switch module. The two basic modules are interconnectable to realize virtually any size and configuration of a time division switch having distributed operation particularly with the control stores associated with the switching elements incorporated into the time switch and space switch modules. As an example, the space switch is integrated with the space control circuitry into a single LSI circuit. Multiple LSI circuits are configured as basic functional units providing desired flexibility in switch size and maintainability. The TST switch system provides for storage of the status of each interstage link as a distinct code in the control store associated with the output connected to each link.

Figure 2:
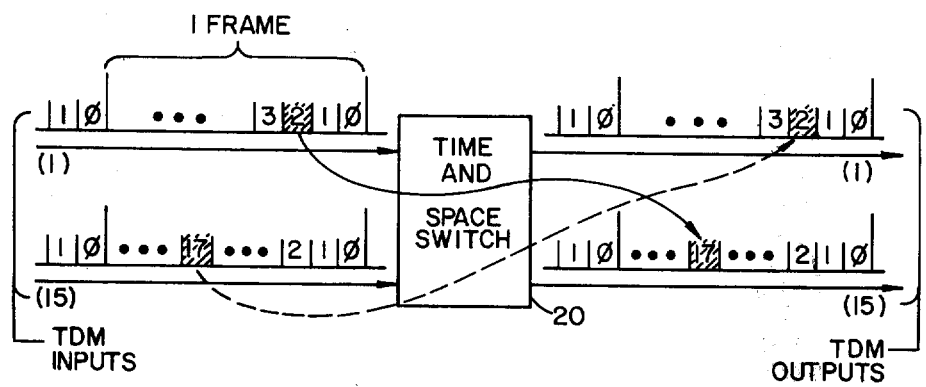
Figure 3:
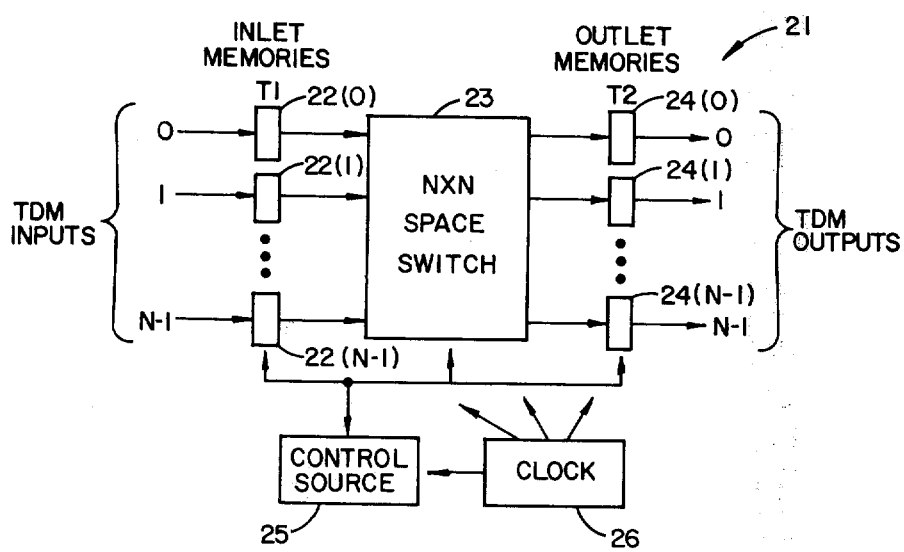
Figure 4:
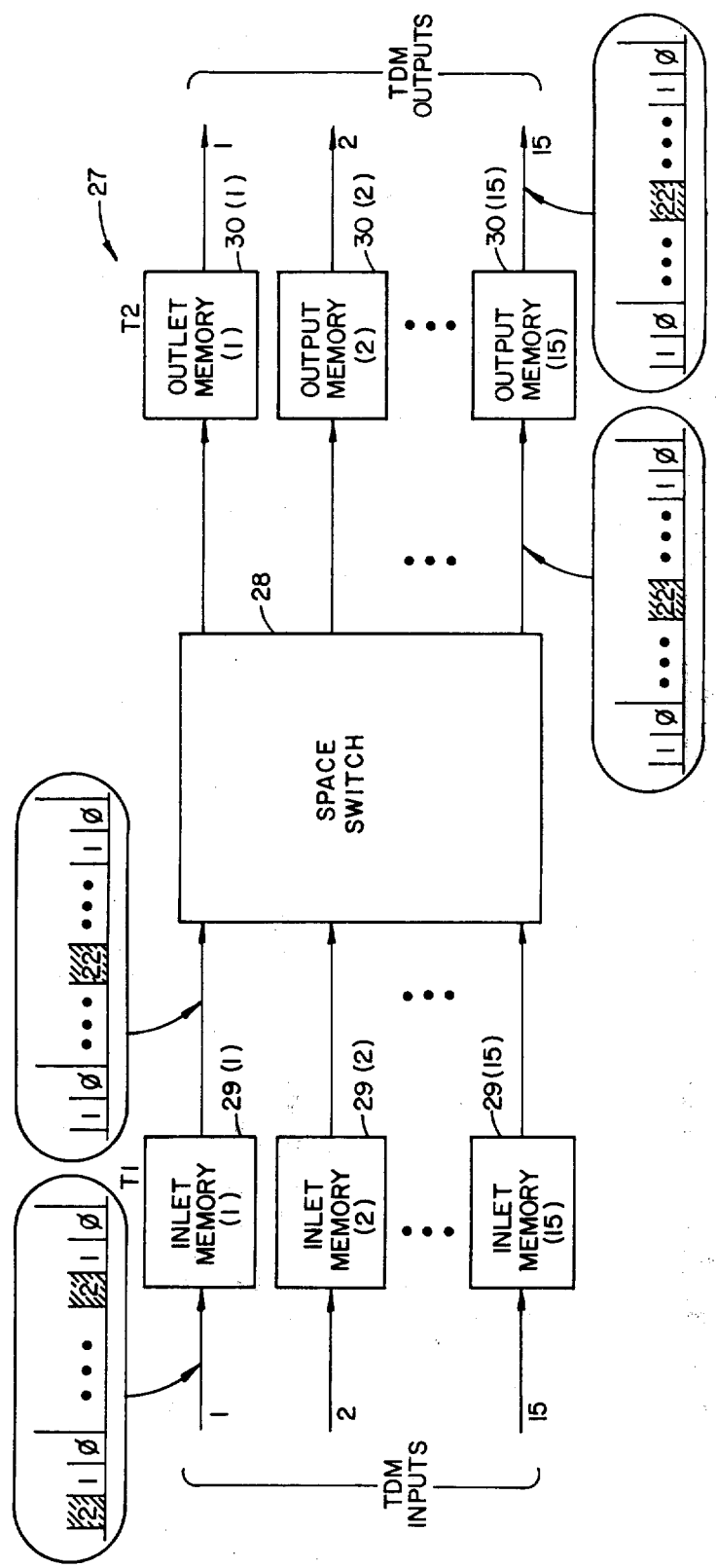
Figure 6:
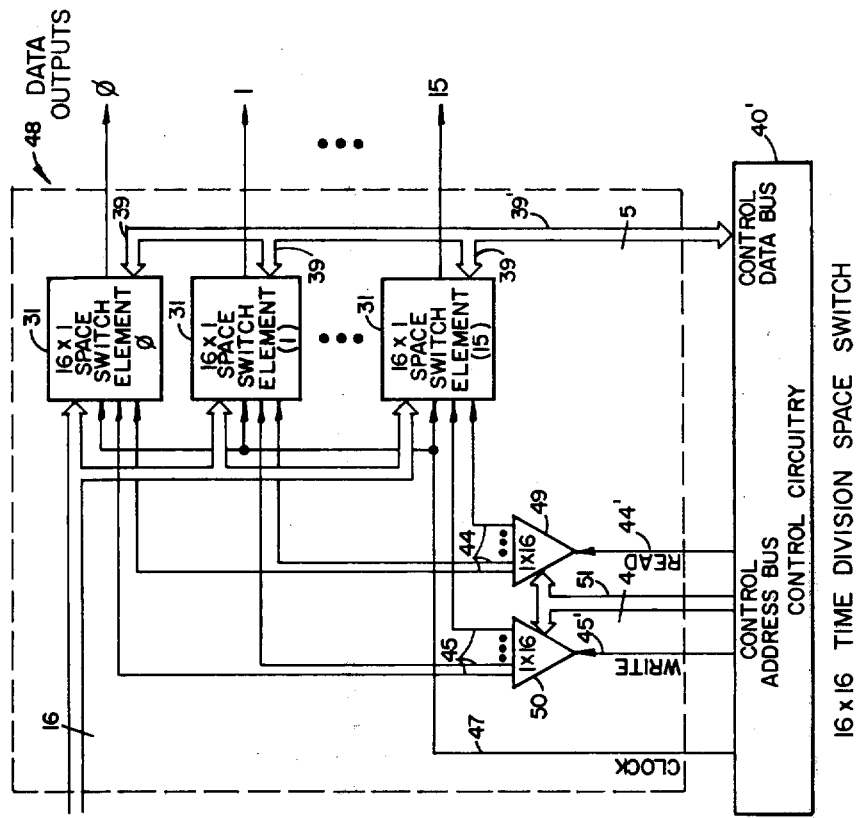
Figure 5:
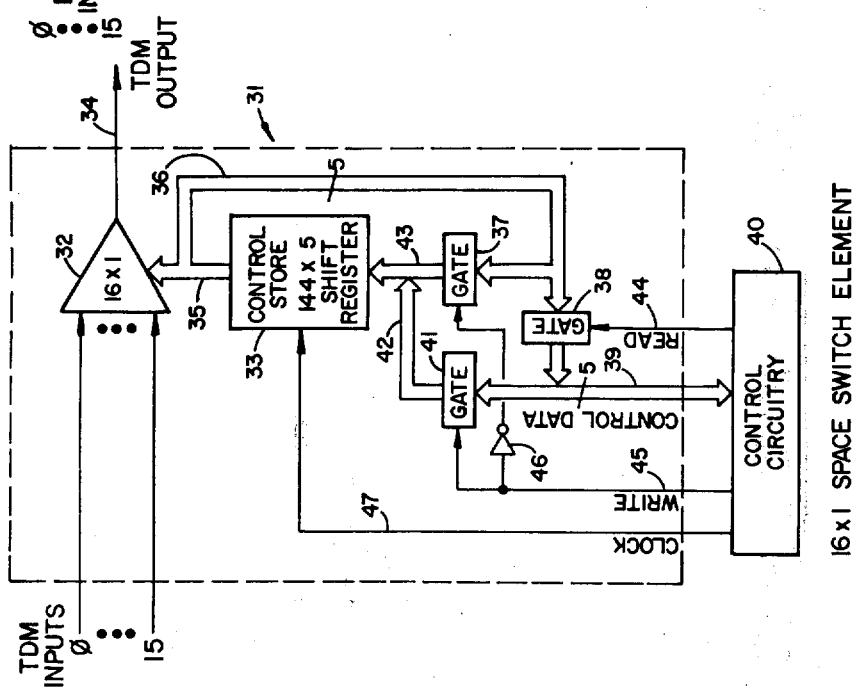
Figure 9A:
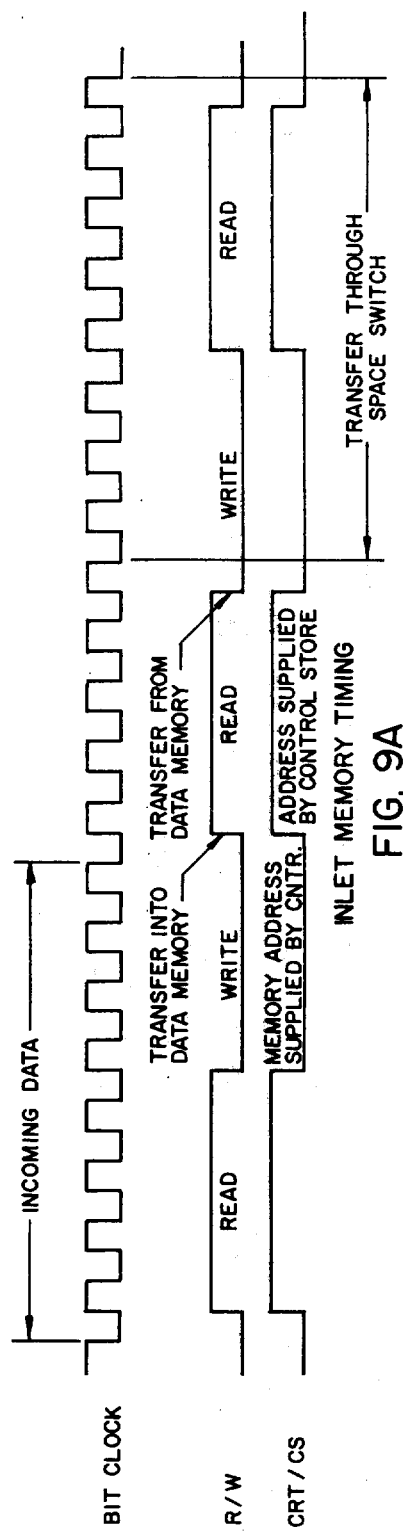
Figure 9B:
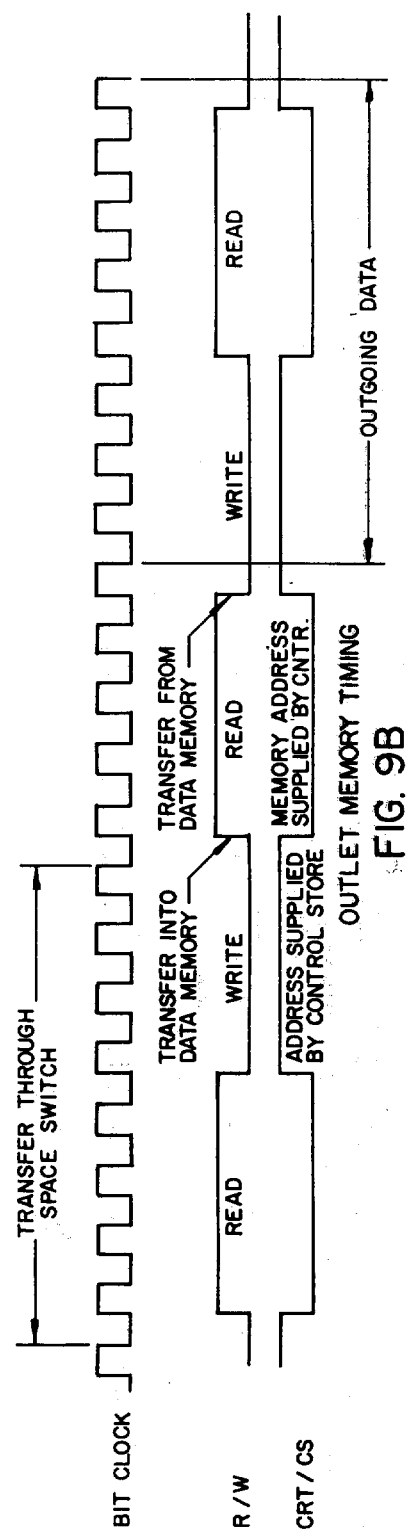
Figure 11:
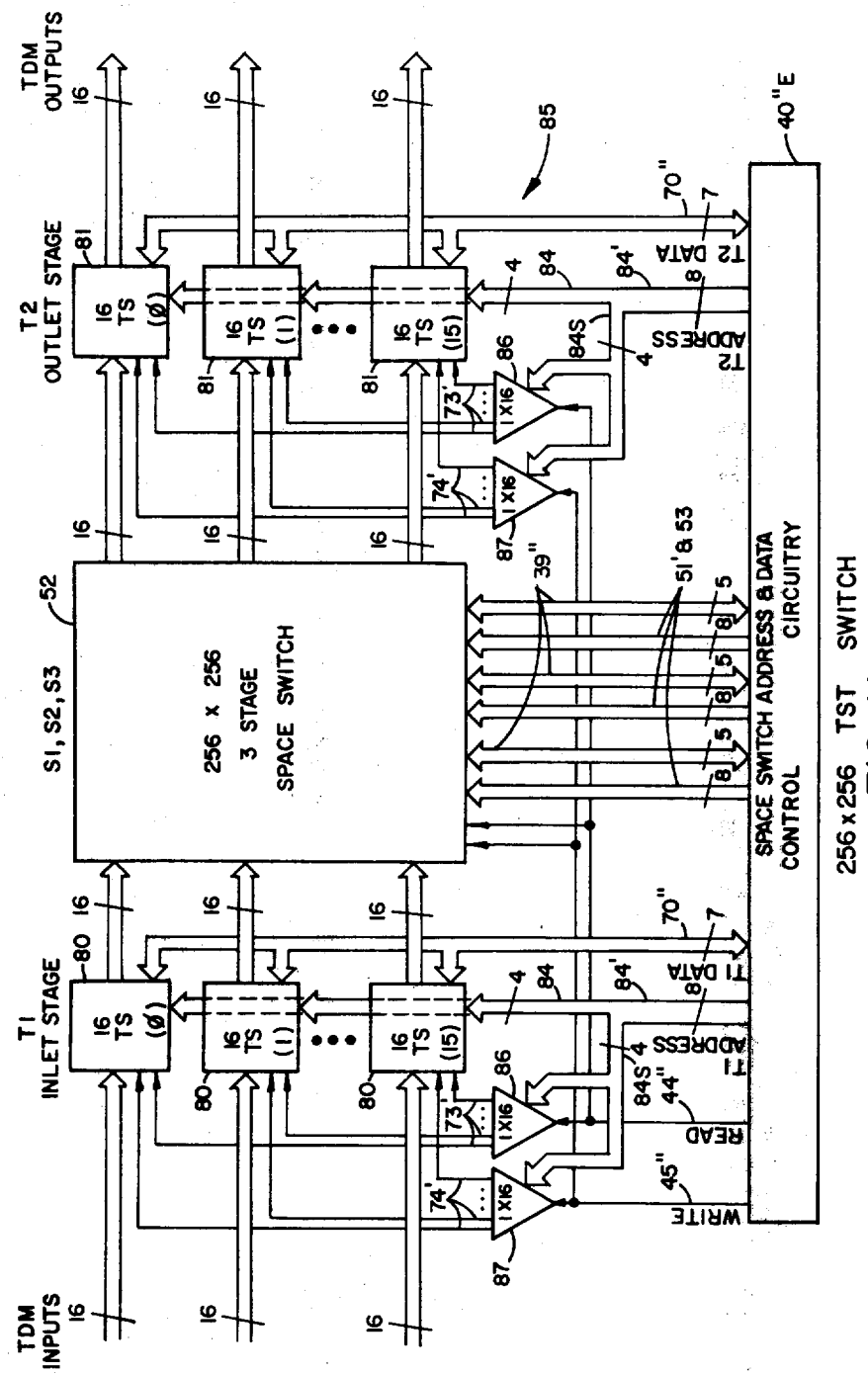

Specific embodiments representing what are presently regarded as the best modes of carrying out the invention are illustrated in the accompanying drawings wherein:

FIG. 1 represents a graphic showing of a format for time division multiplexing (TDM) of digital data;

FIG. 2, a combination graphic and schematic block showing of a TDM input-output time and space switch unit;

FIG. 3, a block schematic showing of a basic TST switch configuration with a control source also indicated;

FIG. 4, a block schematic showing of a basic TST switch, such as shown in FIG. 3, with TDM channel content indicated for an input location and an output location;

FIG. 5, a block schematic and graphic showing of a time division space switch element;

FIG. 6, a block schematic and grapic showing of a time division space switch implemented using a plurality of the space switch elements of FIG. 5;

FIG. 7, a block schematic and graphic showing of a three stage 256×256 time division space switch;

FIG. 8, a block schematic and graphic showing of a time switch element;

FIGS. 9A and 9B, switch inlet memory and outlet memory, respectively, timing waveforms;

FIG. 10, a block schematic and graphic showing of a 16 × 16 TST switch unit such as the unit of FIG. 3, with control interconnect detail added; and, FIG. 11, a block schematic and graphic showing of a 256 × 256 TST switch unit incorporating a 256 × 256 three stage time division space switch.

Referring to the drawings:

As a preliminary step to describing applicants' improved Time Space Time (TST) switches, a description of a basic TST switch and its operation is provided. TST switches are designed to interconnect a number of digital Time Division Multiplex (TDM) communication lines with TDM involving the sharing of individual single transmission paths in time. This is with $c$ communication channels established by dividing time into $c$ slots. Thus, as shown in FIG. 1, each set of $c$ time slots constitutes a frame during which each communication is allowed to send a single word of b bits. In typical digital voice systems, 8-bit words are generated at an 8 KHz rate and, thereby, a pair of 1.536 mbps transmission links are capable of carrying 24 separate conversations. Similarly, an 8.192 mbps link could accommodate 128 64 kbps channels. When such communication channels are switched from one TDM transmission link to another, both time and space translation is required, such as illustrated in FIG. 2. In FIG. 2, TDM inputs (1) and (15), of a plurality of input lines, are shown to feed time and space switch 20 with TDM outputs (1) and (15), of a plurality of output lines emanating therefrom. Channel 2 of the TDM input line (1) is connected to channel 17 of the TDM output line (15), and with full duplex communication requiring a two-way circuit, a second connection path is established, as indicated by the dotted line, transferring channel 17 of TDM input line (15) to channel 2 of TDM output line (1).

A basic TST switch configuration 21 is shown in FIG. 3, with the first stage T1 of the switch being N inlet memories (actually 0 through N-1) 22(0), 22(1) . . . 22(N-1), one for each of the 0 through N-1 TDM inputs, respectively. The c channel words from each input are stored in c successive addresses of the respective inlet memories, with these words then held in the memories until they are transferred through the space switch 23 to the outlet memories 24(0), 24(1) . . . 24(N-1) in the third stage T2, space switch 23 actually being the second stage, where the words are held in outlet memories until they are released on respective 0 through N-1 output TDM lines. Hence, the first stage represents a time switch in that data occurring in the input channels is translated in time to a time slot during which the space switch 23 transfer takes place. The T2 outlet memories 24(0), 24(1) . . . 24(N-1) receive data words from space switch 23 and store them in addresses corresponding to the desired output channel with the time division outputs 0 through N-1 then obtaining their data by addressing successive locations of respective outlet memories. Associated with each inlet memory, space switch stage output, and outlet memory, is a control memory that contains $l$ words corresponding to the $l$ time slots during which data is transferred through the space stage 23. The individual control stores may be separate with individual memories, or collected together in a single control store, subject to control from control source 25 for the T1 inlet memories, the space switch 23 outputs, and the T2 outlet memories, respectively. This system with control source 25 specifies which space switch crosspoints are selected and which inlet and outlet memory locations are accessed during each switch time slot, with the control memories being accessed in cyclic fashion so that each connection is repeated, at the same time, during every frame.

Establishing a connection through a TST switch, from a selected inlet memory to a selected outlet memory, involves finding a time slot during which the selected inlet memory, the selected outlet memory, and an appropriate space path are idle. Thus, the pathfinding operation in a TST switch involves a time search as well as a space search. The space switch connections are time division multiplexed with $l$ time slots per frame, and when $l$ is greater than $c$, the switch is said to be operating with time expansion. The larger $l$ is, the more transfer opportunities there are through the space switch 23. Thus, for given size space switches 23, greater time expansions imply lower blocking probabilities, and for a non-blocking space switch 23, when $l$ is increased to $2c-1$ the TST blocking probability is reduced to zero.

The control source 25 sets up and takes down connections in response to requests and disconnects, acting through the control memories. In setting up calls, the control source 25 accesses the stored status of switching elements to determine idle switching paths and available time slots. Then, when an idle path is found, the corresponding status bits are set to "busy" and the appropriate information is loaded into the control memories. When discontinuing a connection, the control memories are accessed to determine which status bits must be set to idle. Master clock is distributed to all switching elements, as indicated by the plurality of arrowed leads from master clock source 26, to synchronize the operation thereof. Thus, the NXN space switch 23 that, in FIG. 3, is a square switch with an equal number of inputs and outputs, is operated in time divided fashion in synchronism with the time stages. This is with all operations cyclic, so that data occurring in each time slot of successive incoming frames is transferred to the same time slot (channel) of successive outgoing frames. The best structure of a space switch is dependent on the number of inputs and outputs it services. A single stage square space switch, such as the NXN space switch 23 of FIG. 3, is generally most attractive for small switches. Large switches, however, are more attractively implemented with multiple stages.

Referring also to FIG. 4, the TST switch 27 shows a space switch 28 transfer made, such as shown in FIG. 2, for a connection between channel 2 of line 1 and channel 17 of line 15. In the FIG. 4 example shown, as a typical example, switching time slot 22 has been selected for the transfer from inlet 1 to outlet 15. The T1 inlet memories 29(1), 29(2), . . . 29(15) are like the T1 memories 22 of FIG. 3, and the $T_2$ outlet memories 30(1), 30(2), . . . 30(15) are like the T2 memories 24 of FIG. 3. The various elements of TST switch 27 are controlled by cyclicly retrieving control information from a set of memories, just as with the embodiment of FIG. 3. New connections are set up and existing connections taken down by updating the information stored in the control memories, one of which is associatied with each inlet memory, space stage output, and outlet memory. The control memories contain one word for each time slot, with the information stored in the words specifying which connections are established during the respective time slots. It should be noted that control stores can be implemented using ramdom access memories and a counter to effect cyclic retrieval. The counter would operate in a modulo L (144) fashion. Thus, addresses 0 through 143 would be accessed sequentially with word 0 being addressed after word 143.

The time division switch element circuit 31 of FIG. 5 includes a switching mechanism with a 16 to 1 selector 32 controlled by the output of a 144 × 5 end around shift register 33 to selectively connect one of 0 through 15 TDM inputs to the single TDM output line 34. The 144×5 end around shift register circuit 33 constituting a control store has a five-line output 35 connected to the 16 to 1 selector 32, and also through recirculation loop 36 to gates 37 and 38, and through gate 37 to the bottom of the shift register 33. The recirculation loop 36 is also connected through gate 38 to a control data link 39 interconnecting control circuitry 40 and an additional gate 41. Gate 41 has an output line link 42 connection to line link 43 interconnecting gate 37 and the bottom of shift register 33. Read signals are fed from control circuitry 40 through read line 44 to control gate 38. Write signals are fed from control circuitry 40 through write line 45 directly to gate 41 and also through inverter amplifier 46 to gate 37 for control of both gates 37 and 41. Clock line 47 feeds time slot clock from control circuitry 40 to the end around shift register circuit 33.

Operation of this switching mechanism is provided with each occurrence of a clock pulse causing a new 5-bit control word to be shifted to the top of the shift register. This new control word then specifies a new connection that is held while message data is being gated from the selected input to the data output line 34. Whenever a clock pulse occurs, the current control word is circulated to the bottom of the shift register to thereby repeat each connection once every 144 clock pulses. With the following action, new connections are established by loading new control information into the bottom of the shift register. This is accomplished by setting the WRITE input to a "ONE" during the desired time slot to close gate 37, blocking the nomal recirculation process, while new data is passed from the control data bus 39 through gate 41. This same procedure is also used to take down a connection by writing an idle code into the appropriate time slot. The control word in current use can be gated onto the control data bus 39 through gate 38 by setting the READ input to a " ONE". Thus, connections can be traced and status of a particular element determined. The implementation of FIG. 5 uses 4 bits of a control word to specify one of 16 connections and 1 bit to designate busy/idle status of the respective time slot. If an idle output is designated by a distinct 5-bit code, one of 31 inputs could be selected by the remaining codes, alternately, a 4-bit control word can control 15 inputs and leave a distinct code to designate an idle output.

A complete switching array implemented through interconnecting a plurality of the time division switch element circuits 31 of FIG. 5 is shown in FIG. 6 as a 16 × 16 time division space switch 48. Sixteen 16 × 1 element circuits 31 are used, with each 16 to 1 matrix selector 32 input connected to a corresponding input of every element, and the sixteen distinct outputs 0 through 15 are individually controlled by their respective control stores. With the 16 × 16 time division space switch 48, READ line 44' from control circuitry 40' is fanned out selectively to sixteen READ lines 44 for individual switch element circuits 31 through the switching mechanism of 1 to 16 selector 49, and WRITE line 45' from control circuitry 40' is fanned out selectively to sixteen WRITE lines 45 for individual switch element circuits 31 through the switching mechanism of 1 to 16 selector 50. The 1 to 16 selectors 49 and 50 are controlled by control inputs from control circuitry 40' passed through control address bus 51 to the selectors 49 and 50. Control data links 39, of individual switch element circuits 31 to and from control data bus 39', interconnect control circuitry 40' and the switch element circuits 31. Time slot clock 47 is connected from control circuitry 40' to the switch element circuits 31.

In providing the $S_1$, $S_2$, and $S_3$ 256× 256 three-stage time divided space switch 52 of FIG. 7, sixteen of the 16 × 16 time division space switches 48 are used in each of the three stages, forty-eight in all. Sixteen TDM inputs are fed individually to each of the space switches 48 in the first stage $S_1$, thereby providing for 256 data inputs to the time divided space switch 52. Sixteen outputs of each first stage $S_1$ space switch 48 are individually cross-connected to inputs of space switches 48 of the second stage $S_2$ that are, in like manner, cross-connected to inputs of space switches 48 of the third stage $S_3$, from each of which sixteen TDM outputs are provided to total 256 data outputs, in all, from space switch 52. With the three stage space switch 52 of FIG. 7, READ line 44'' from control circuitry 40'' is fanned out selectively to sixteen READ lines 44' for individual space switches 48 of a switch stage through the switching mechanism of 1 to 16 selectors 49', in parallel, for the three stages $S_1$, $S_2$, and $S_3$. WRITE line 45'' from control circuitry 40'' is fanned out selectively to sixteen WRITE lines 45', for individual space switches 48 of a switch stage through the switching mechanism of 1 to 16 selectors 50', in parallel, for the three stages $S_1$, $S_2$, and $S_3$. The 1 to 16 selectors 49' and 50' are controlled by address inputs from control circuitry 40''', passed through control address buses 53, one for each of the three stages $S_1$, $S_2$, and $S_3$, to the selectors 49' and 50'. Please note that the number of individual lines in respective buses such as 39 and 36 in FIG. 5, and 39' and 51 and FIG. 6, and elsewhere, are indicated by a number at a slant line through each respective bus.

Thus, a three-stage 256× 256 time division space switch is provided with each stage consisting of sixteen 16 × 16 switching matrices with the entire switch requiring 768 individual 16 × 1 space switch elements 31. Individual elements are addressed to set up or take down connections by loading the appropriate information on the control store data and address buses, and with separate buses being used as set forth for each stage, the stages are addressable simultaneously thereby allowing a complete path to be set up or taken down in one operation.

Referring now to FIG. 8, the time switch element 54 includes a data memory 55 with the data input fed through a series to parallel shift register conversion unit 56. The data output is fed through parallel to series shift register conversion unit 57 as stepped along with unit 56 by bit clock applied through line 58 from control circuitry 40'''. The data memory 55 addresses are obtained from the seven line output 59 of 144 × 7 end around shift register 60, as passed by gate 61 and seven line bus 62, or by the seven line output 63 of counter 64, as passed by gate 65 and bus 62. Read/write (R/W) control is obtained through line 66 form control circuitry 40'''. The 144 × 7 end around shift register circuit 60 constituting a control store has the seven line output 59 also connected through recirculation loop 67 to gates 68 and 69, and through gate 68 to the bottom of the shift register 60. The recirculation loop 67 is also connected through gate 69 to a control data link 70 interconnecting control circuitry 40''' and an additional gate 71. Gate 71 is output joined together with gate 68 via bus system 72 as the seven line input to the bottom of shift register 60. Read signals are fed from control circuitry 40''' through read line 73 to control gate 69. Write signals are fed from control circuitry gate 40''' through write line 74 directly to gate 71 and also through inverter amplifier 75 to gate 68 for control of both gates 68 and 71. In like manner, data memory 55 address selection signals are fed from control circuitry 40''' through CTR/CS line 76 directly to counter gate 65 and also through inverter amplifier 77 to gate 61 for control of both gates 61 and 65, with only one gate being open, at a time, for signal flow. Thus, memory addresses are obtained from either of two sources; from counter 64, when CTR/CS is "ONE", or from the control store shift register when CTR/CS is "ZERO". Bit clock line 58 feeds bit clock from control circuitry 40''' to the series to parallel (S/P) conversion unit 56, and to the parallel to series (P/S) conversion unit 57. Reset signals from control circuitry 40''' are fed to counter 64 through reset line 78, with reset being used to initialize the counter circuit when power is first applied in a power on, clear, action.

The time switch element circuit 54 of FIG. 8 is usable as either an output oriented time switch or as an input oriented time switch. When used as an output oriented time switch, incoming data is stored in sequential memory locations, but random access is employed for output data. Thus, memory addresses are obtained by selecting counter outputs during data memory writes, and the control store outputs are obtained during data memory reads. Output oriented time switches are used as inlet memory stages with the TST switches set forth herein. Input oriented time switches, conversely, write randomly, but read sequentially, with the counter output selected during data memory reads and the control store output selected during data memory writes. Thus, input oriented time switches are used as outlet memory stages with the TST switches of this case. It follows that use of the same basic time switch element circuit for both output oriented time switches and input oriented time switches allows use of similar control information by the input and output memory stages of a TST switch. This is with serial data fed to and taken from TST switches being converted to and from the parallel format through each of the data memory stages.

Referring to the inlet memory and outlet memory timing waveforms of FIGS. 9A and 9B, these are waveforms for the basic time switch element circuit 54 used in the two modes of operation. This difference in operation is determined merely by the sense of the CTR/CS input with respect to the R/W input. Thus, for outlet memory use, the CTR/CS input is inverted with respect to the R/W waveform, while for inlet memory use, the CTR/CS is the same as, and can be obtained driectly from, the R/W source.

In both cases, eight bits of data are transferred into the series to parallel (S/P) converter under control of the bit clock. After every eighth pulse, an 8-bit word is transferred into the data memory, where it is stored until such time as it is transferred to the parallel to series (P/S) converter for subsequent serial output.

The R/W input serves not only to control the data memory operation, but serves also to increment the counter and to shift control words in the control store. Under normal operation, the control store operates as a recirculating shift register. However, whenever the "WRITE" input is active, the recirculation is blocked by gate 68, and new data is inserted into the control store by passing data from control bus 70 through gate 71 to the shift register 60.

As shown in FIG. 8, a data memory with 128 words requires 7 bits of address. Thus the control store is 7 bits wide, with 144 words, for a switch with 144 internal time slots. An idle time slot is encoded as one particular 7-bit code. Thus, only 127 memory locations are actually available for message data.

A time expansion of 144/128 = 1.125 is realized by operating the memory R/W cycle at 868 ns. intervals. As 144 opportunities exist to write into an inlet memory, 16 inlet memory write accesses are unused. Similarly, 16 outlet memory read accesses are unused.

Time switching stages of a TST switch are implemented using a plurality of time switch elements 54 such as shown in the 16 × 16 TST switch 79 of FIG. 10 with 16 time switch elements used of the $T_1$ inlet stage 80, and 16 time switch elements used for the $T_2$ outlet stage 81. The 16 × 16 space switch 48 is implemented using 16 of the space switch elements 31 of FIG. 5, as shown in FIG. 6. The 1 × 16 selector read and write circuits 82 and 83, operated by control addresses through four line buses 84 from control circuitry 40''', are used to address individual switch elements when reading from or writing into the selected control stores. Control circuitry 40''' is the initiating source for the necessary control signals and feeds the address and data buses to set up and take down connections. $T_1$ and $T_2$ stage control data is fed through seven line buses 70' that branch into buses 70 for the respective time switch elements 54. The $T_1$ and $T_2$ stage address buses 84 control the 1 × 16 selector circuits 82 and 83, to distribute read and write control signals from control circuitry 40''' passed through read line 73' and write line 74' to the plurality of read lines 73 and the plurality of write lines 74 in both the $T_1$ inlet stage 80 and $T_2$ outlet stage 81.

The 256 × 256 TST switch 85 of FIG. 11 is much like the TST switch 79 of FIG. 10; the major difference being that of capacity, in having sixteen times the line capability of TST switch 79. The 256 × 256 3-stage time divided space switch 52 of the TST switch 79 is the same as that of FIG. 7, indicated in greatly simplified, single block form, with some control inputs and outputs interconnected to the expanded control circuitry 40''E. The $T_1$ and $T_2$ data buses 70'' connect to a plurality of sixteen time switch element 54 unit sections 80 and 81 in the memory stages. The $T_1$ and $T_2$ address buses 84' are shown as 8-line buses extending from control circuitry 40''E, splitting into two 4-line bus branches; branch 84, connected to selectors 82 and 83, with each of the plurality of unit sections 80 and 81, and a branch 84S extended to 1 × 116 read selectors 86 and 1 × 16 write selectors 87 that are connected to read line 44'' and write line 45'', respectively, for addressing control to unit sections 80 and 81. Thus a higher capacity TST switch is implemented, using 256 time switch elements in the inlet stage $T_1$, 256 time switch elements in the outlet stage $T_2$, and 256 space switch elements in each of three space stages $S_1$, $S_2$, and $S_3$. This is with the time switching stages composed of sixteen 16-element time switch arrays such as the 16-element array used at the input and at the output of the TST switch 79 of FIG. 10. Here again, the control circuitry 40''E generates the necessary control signals and operates to feed address and data buses to set up or take down connections.

Whereas, this invention is herein illustrated and described with respect to several embodiments thereof, it should be realized that various changes may be made without departing from essential contributions to the art made by the teachings hereof.

We claim:

1. In a switch for interconnecting between data incoming and outgoing digital time division multiplex communication lines: time division digital signal switch element means including, multi-word end around shift register means having an input end and an output end; through digitial data transmitting means; multi-path control signal bus means interconnecting the output end of said multi-word end around shift register means and said through digital data transmitting means; said multi-word end around shift register means including recirculation loop bus means with first gate means through to the input end of the shift register; control data source means; control data bus means with second gate means interconnecting said control data source means and said input end of the shift register; activating control means for said first and second gate means; and step control signal input means to said multi-word end around shift register means.

2. The time division digital signal switch element means of claim 1, with bus means interconnect through third gate means from said recirculation loop bus means to said control data bus means.

3. The time division digital signal switch element means of claim 2, with said third gate means having read control signal input means.

4. The time division digital signal switch element means of claim 3, wherein said activating control means for said first and second gate means is a write control signal input means.

5. The time division digital signal switch element means of claim 4, with signal inversion means in the write control signal input path to one of said first and second gate means.

6. The time division digital signal switch element means of claim 3, with said end around register means comprising control store means; and control store addressing means connected to said control store means of individual switch element means.

7. The time division digital signal switch element means of claim 6, wherein said switch element means is a space switch element.

8. The time division digital signal switch element means of claim 7, wherein said through digital data transmitting means in multi-input to single output line selector means.

9. The switch of claim 8, wherein a plurality of inputs are connected to a plurality of multi-input to single output line selectors of a plurality of said space switch elements.

10. The switch of claim 9, wherein single read control signal input to multi-output line read selector means has individual output lines connected as the read control signal input means to each of the plurality of said space switch elements.

11. The switch of claim 10, wherein single write control signal input to multi-output line write selector means has individual output means connected as the write control signal input means to each of the plurality of said space switch elements.

12. The switch of claim 11, with control address bus means connected from said control data source means to said read selector means and to said write selector means.

13. The time division digital signal switch element means of claim 6, wherein said switch element means is a time switch element.

14. The time division digital signal switch element means of claim 13, wherein said through digital data transmitting means is data memory means with inputs fed through series to parallel conversion means and outputs fed through parallel to series conversion means.

15. The switch of claim 13, wherein a plurality of said time switch elements are interposed individually in a plurality of digital time division multiplex communication path means.

16. The switch of claim 15, wherein single read control signal input to multi-output line read selector means has individual output lines connected as the read control signal input means to each of the plurality of said time switch elements.

17. The switch of claim 16, wherein there are a plurality of time switch sections in a time switch stage each having a plurality of said time switch elements; and with at least two levels of single read control signal input to multi-output line read selector means having the outputs of a first level being the inputs of the second level.

18. The switch of claim 16, wherein single write control signal input to multi-output line write selector means has individual output lines connected as the write control signal input means to each of the plurality of said time switch elements.

19. The switch of claim 18, with control address bus means connected from said control data source means to said read selector means and to said write selector means.

20. The switch of claim 18, wherein there are a plurality of time switch sections in a time switch stage each having a plurality of said time switch elements; and with at least two levels of single write control signal input to multi-output line write selector means with the outputs of a first level being the inputs of the second level.

21. The switch of claim 20, wherein there are a plurality of time switch sections in a time switch stage each having a plurality of said time switch elements; and with at least two levels of single read control signal input to multi-output line read selector means with the outputs of a first level being the inputs of the second level.

22. The switch of claim 21, with control address bus means connected from said control data source means to all of said read, and write, signal input to multi-output line selector means.

23. The switch of claim 6, with a plurality of said switch element means in the form of space switch elements in space switch staging means; and including a plurality of said switch element means in the form of time switch elements in time switch staging means.

24. Th switch of claim 23, with said time switch staging means divided into an input time switch staging section and an output staging section; and with said space switch staging means interposed as space switch staging between said input and output time switch staging sections in a time space time switch.

25. The switch of claim 24, wherein said space switch staging means is in the form of a single stage of space switch element means.

26. The switch of claim 24, wherein said space switch staging means is in the form of a plurality of space switch stages all through signal flow path interposed between said input and output time switch staging sections.

27. In a switch for interconnecting between data incoming and outgoing digital time division multiplex communication lines: individual time division digital signal switch element control means including, control store means for storage of the status of interstage links in a switch; cyclic retrieval means connected to said control store means for cyclic retrieval of stored status information from said control store means; control data source means interconnected with said control store means for interrogating and modifying information stored in said control store means; and step control signal input means to said control store means for activating information retrieval and modification.

28. The switch of claim 27, with signal path switching means; and said control store means an integrated structure with said signal path switching means.

29. The switch of claim 27, wherein said individual time division digital signal switch element means are in two basic configurations, a space switch elemet and a time switch element interconnectable in pluralities of each said space and time switch elements through an extensive range of time division multiplex switch sizes and configurations.

30. The switch of claim 10, wherein there are a plurality of space switch sections in a space switch stage each having a plurality of said space switch elements; and with at least two levels of single read control signal input to multi-output line read selector means having the outputs of a first level being the inputs of the second level.

31. The switch of claim 12, wherein there are a plurality of space switch sections in a space switch stage each having a plurality of said space switch elements; and with at least two levels of single write control signal input to multi-output line write selector means will the outputs of a first level being the inputs of the second level.

32. The switch of claim 31, wherein there are a plurality of space switch sections in a space switch stage each having a plurality of said space switch elements; and with at least two levels of single read control signal input to multi-output line read selector means with the outputs of a first level being the inputs of the second level.

33. The switch of claim 31, with control address bus means connected from said control data source means to all of said read, and write, signal input to multi-output line selector means.

* * * * *

REEXAMINATION CERTIFICATE (1252nd)
United States Patent [19]
Collins et al.

[11] B1 3,956,593
[45] Certificate Issued  Apr. 17, 1990

[54] TIME SPACE TIME (TST) SWITCH WITH COMBINED AND DISTRIBUTED STATE STORE AND CONTROL STORE

[75] Inventors: Arthur A. Collins; John C. Bellamy, II, both of Dallas; Richard L. Christensen, Richardson, all of Tex.

[73] Assignee: Sevin Rosen Bayless Borovoy, Dallas, Tex.

Reexamination Request:
No. 90/001,797, Jun. 21, 1989

Reexamination Certificate for:
Patent No.: 3,956,593
Issued: May 11, 1976
Appl. No.: 514,828
Filed: Oct. 15, 1974

[51] Int. Cl.$^5$ .......................... H04Q 11/04; H04J 3/00
[52] U.S. Cl. ............................................ 370/63; 370/66
[58] Field of Search ................ 370/58.1, 58.3, 63, 370/64, 65.5, 66, 68

[56] References Cited

U.S. PATENT DOCUMENTS

| | | | |
|---|---|---|---|
| 3,715,505 | 2/1973 | Gordon | 370/60 |
| 3,736,381 | 5/1973 | Johnson et al. | 370/63 |
| 3,740,480 | 6/1973 | Krupp et al. | 370/68 |
| 3,796,835 | 3/1974 | Closs | 370/60 |
| 3,912,873 | 10/1975 | Skaperda | 370/63 |

OTHER PUBLICATIONS

Chen, C. M., "Traffic Analysis of a PCM Switching System", GTE Tech. Journal, Jul. 1972.
Granello, G., "Switching Networks for PCM Time-Division Networks", Int. Switching Symposium, Jun. 1972.
Hirvela, R. J., "The Application of Computer Controlled PCM Switching to Automatic Call Distribution", IEEE Commun. Sys. and Tech. Conf., May 1974.
Milort, W. & Buchner, R. B., "The Switching Network of Philips' PDX System", Philips Telecommunications Review, Oct. 1973.
Rose, D. J., "PCM Tandem Switching Field Trial in the U.K.", Int. Switching Symposium, Jun. 1972.
Treves, S. R., and Dupieux, J. G., "A PCM Hybrid Terminal Switching Development", Int. Switching Symposium, Jun. 1972.

*Primary Examiner*—Douglas W. Olms

[57] ABSTRACT

A time space time (TST) switch using two basic modules, a time switching module and a space switching module with individual module elements interconnectable to realize a great range of time division switch sizes and configurations. Control stores and state stores associated with respective switching elements are combined and incorporated into the time switch and space switch modules.

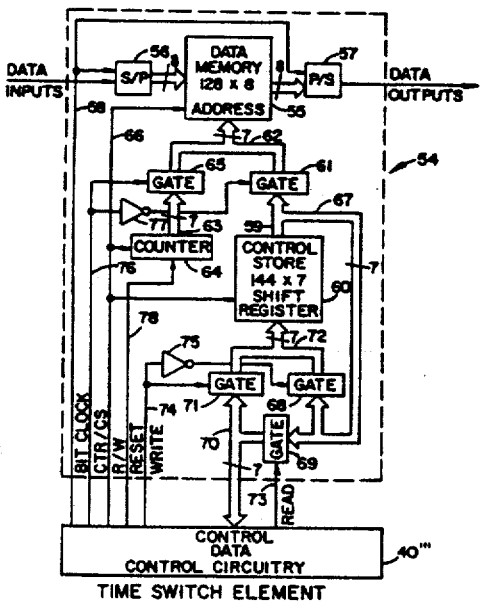

TIME SWITCH ELEMENT

ID
REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-26 and 29-33 is confirmed.

Claims 27 and 28 are cancelled.

New claims 34-53 are added and determined to be patentable.

34. *In a switch for interconnecting between data incoming and outgoing digital time division multiplex communication lines, said switch having both time and space stages and interstage links therebetween, the improvement comprising:*
  *a plurality of individual time division digital signal switch element control modules, each such module combined with an associated time signal path switching means of said switch for switching between the time slots of the inputs and outputs of a single digital time division multiplex communication line of said switch, but said module not being combined with any space signal path switching means, or said module is combined with an associated space signal path switching means of said switch for switching selected time slots from any of multiple time division digital multiplex communication lines of said switch to a single digital time division multiplex communication line, but said module not being combined with any time signal path switching means of said switch, to form a time or space switch element, each control module including its own control store means for storage of the status of said interstage links in said switch;*
  *a plurality of cyclic retrieval means, each connected to and combined with one of said control store means for cyclic retrieval of stored status information from said control store means;*
  *control data source means interconnected with said control store means for interrogating and modifying information stored in said control store means; and*
  *step control signal input means to said control store means for activating information retrieval and modification, whereby said switch is capable of distributed operation, allowing time switch elements to be physically separated from space switch elements of the switch and allowing space switch elements to be physically separated from time switch elements of said switch.*

35. *The improvement in the switch of claim 34 further characterized by said status of the interstage links in said switch being the connection information pertaining to said interstage links.*

36. *The improvement in the switch of claim 34 further characterized by said status of the interstage links in said switch being the busy/idle information pertaining to said interstage links.*

37. *The improvement in the switch of claim 34 further characterized by said status of the interstage links in said switch being both the connection information and the busy/idle information pertaining to said interstage links.*

38. *The improvement of the switch of claim 34 further characterized by said control store means being a random access memory.*

39. *The improvement in the switch of claim 34 further characterized by said cyclic retrieval means being a counter.*

40. *The improvement in the switch of claim 34 further characterized by said means for interrogating and modifying information stored in said control store means including read/write control lines coupled to said control store means to supply read and write signals to said control store means.*

41. *The improvement in the switch of claim 40 further characterized by said means for interrogating and modifying information stored in said control store means including read/write control lines coupled to said control store means to supply read and write signals to said control store means and gating circuitry coupled between said control lines and said control store for enabling said control store to be either interrogated or modified.*

42. *The improvement in the switch of claim 34 further characterized by said step control signal input means being a source of clock pulses transmitted to said control store for activating said information retrieval and modification.*

43. *The improvement in the switch of claim 34 further characterized by each of the space or time signal path switching means being integrated with its respective associated control module.*

44. *The improvement in the switch of claim 34 further characterized by said switch including a plurality of space switch elements interconnected to form a space stage or including a plurality of time switch elements interconnected to form time switch stage.*

45. *The improvement in the switch of claim 44 wherein said switch elements are time switch elements interconnected to form a time switch stage.*

46. *The improvement in the switch of claim 44 wherein said switch elements are space switch elements interconnected to form a space switch stage.*

47. *The improvement in the switch of claim 45 further characterized by two of said time switch stages being interconnected with a space switch stage to form a TST switch.*

48. *The improvement in the switch of claim 47 further characterized by at least one of said time switch elements including a serial-to-parallel converter coupled to the input of said time switch element and a parallel-to-serial converter coupled to the output of said time switch element, further enabling said time switch element to be located remotely from any space switch elements.*

49. *The improvement in the switch of claim 46 further characterized by two of said space switch stages being interconnected with a time switch stage to form an STS switch.*

50. *The improvement in the switch of claim 34 further characterized by said data incoming and data outgoing communication lines each having a predetermined number of time slots per frame, and where said interstage links of said space stage or stages have more time slots than said predetermined number, whereby said switch is capable of operating with time expansion.*

51. *The improvement in the switch of claim 34 further characterized by said control modules and said associated* signal path switching means being combined in an integrated circuit.

52. The improvement in the switch of claim 51 further characterized by said signal path switching means being a time signal path switching means and said integrated circuit comprising a time slot interchange module.

53. The improvement in the switch of claim 51 further characterized by said signal path switching means being a space signal path switching means and said integrated circuit comprising a time division space switch module.

* * * * *

REEXAMINATION CERTIFICATE (2018th)
United States Patent [19]
Collins et al.

[11] B2 3,956,593
[45] Certificate Issued  May 25, 1993

[54] TIME SPACE TIME (TST) SWITCH WITH COMBINED AND DISTRIBUTED STATE STORE AND CONTROL STORE

[75] Inventors: Arthur A. Collins; John C. Bellamy, II, both of Dallas; Richard L. Christensen, Richardson, all of Tex.

[73] Assignee: Arthur A. Collins, Inc., Dallas, Tex.

Reexamination Requests:
No. 90/002,358, Jun. 4, 1991
No. 90/002,370, Jun. 4, 1991
No. 90/002,543, Dec. 17, 1991
No. 90/002,784, Jul. 15, 1992

Reexamination Certificate for:
Patent No.: 3,956,593
Issued: May 11, 1976
Appl. No.: 514,828
Filed: Oct. 15, 1974

Reexamination Certificate B1 3,956,593 issued Apr. 17, 1990.

[51] Int. Cl.$^5$ .................. H04Q 11/04; H04J 3/00
[52] U.S. Cl. ................................ 370/63; 370/66
[58] Field of Search ................................ 370/63, 66

[56] References Cited
U.S. PATENT DOCUMENTS 3,912,873  10/1975  Skaperda ........................ 370/16
3,920,916  11/1975  Brightman et al. .............. 370/66

OTHER PUBLICATIONS

G. Granello, *Int'l Switching Symposium*, Jun. 1972, "Switching Networks for PCM Time Division Exchanges," pp. 81–88.
A. Mack et al., *Proc. of the 1972 Int'l Conf. on Comm.*, Jun. 1972, "Time Division Digital Switch Matrix Technique Evaluation," pp. 40-1 to 40-7.
A. Mack et al., *Final Tech. Report, RADC-TR-72-27*, vol. III, Nov. 1972, "Integrated Circuit/Message Switch Feasibility Model Development, Test, and Evaluation, vol. III, Time Division Module".
Deposition of Alfred Mack, pp. 80 (line 12) to 82 (line 23) (W.D.Tex) (90–201).
Cross-Examination of Alfred Mack, p. 1682, lines 15–22 (W.D.Tex) (90–201).
Direct Examination of Alfred Mack, p. 1665 beginning at line 7 (W.D.Tex) (90–201).
Direct Examination of Alfred Mack, pp. 1653 (line 6) to 1655 (line 20) (W.D.Tex) (90–201).
Plaintiff's Trial Exhibit 91A.
Direct Examination of Jerry Gibson, p. 156 (W.D.Tex) (90–201).
Deposition of Robert A. Pedersen, pp. 894–895 (W.D.Tex) (90–201).
Cross-examination of Jerry Gibson, pp. 230–233, 237–240 (W.D.Tex) (90–201).
C. Dumousseau, *IEEE Trans. on Comm. & Elec.*, Mar. 1964, "A Local Area Integrated PCM Telephone Network," pp. 158–162.

*Primary Examiner*—Douglas W. Olms

[57] ABSTRACT

A time space time (TST) switch using two basic modules, a time switching module and a space switching module with individual module elements interconnectable to realize a great range of time division switch sizes and configurations. Control stores and state stores associated with respective switching elements are combined and incorporated into the time switch and space switch modules.

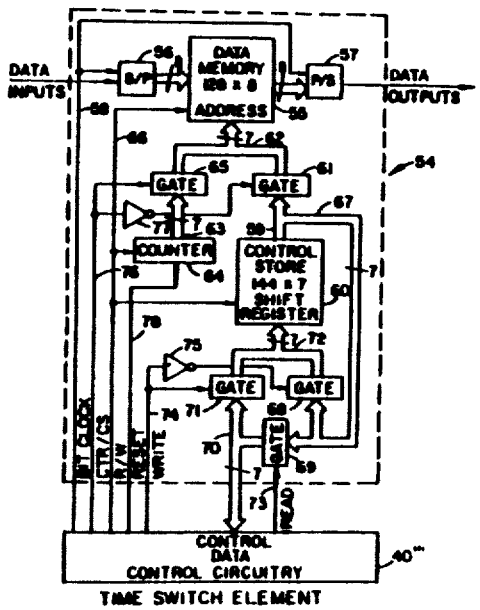

TIME SWITCH ELEMENT

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-26 and 29-53 is confirmed.

Claims 27 and 28 were previously cancelled.

* * * * *